(12) United States Patent
Chang (10) Patent No.: US 9,400,570 B2
(45) Date of Patent: Jul. 26, 2016

(54) STYLUS WITH INERTIAL SENSOR

(71) Applicant: Apple Inc., Cupertino, CA (US)

(72) Inventor: Ray L. Chang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 33 days.

(21) Appl. No.: 14/542,483

(22) Filed: Nov. 14, 2014

(65) Prior Publication Data

US 2016/0139690 A1 May 19, 2016

(51) Int. Cl.
| | |
|---|---|
| G06F 3/03 | (2006.01) |
| G06F 3/038 | (2013.01) |
| G06F 3/0354 | (2013.01) |
| G06F 3/046 | (2006.01) |
| G06F 3/0338 | (2013.01) |

(52) U.S. Cl.
CPC ............ *G06F 3/0383* (2013.01); *G06F 3/0338* (2013.01); *G06F 3/03545* (2013.01); *G06F 3/046* (2013.01)

(58) Field of Classification Search
None
See application file for complete search history.

(56) References Cited

U.S. PATENT DOCUMENTS

| | | | |
|---|---|---|---|
| 5,774,571 A | 6/1998 | Marshall | |
| 5,959,616 A | 9/1999 | Challener | |
| 6,307,956 B1 | 10/2001 | Black | |
| 6,473,072 B1 | 10/2002 | Comiskey | |
| 6,621,697 B2 | 9/2003 | O'Hara et al. | |
| 7,184,033 B2 | 2/2007 | Burrus, IV et al. | |
| 7,348,968 B2 | 3/2008 | Dawson | |
| 7,467,948 B2 | 12/2008 | Lindberg et al. | |
| 8,059,105 B2 | 11/2011 | Rosenberg | |
| 8,482,545 B2 | 7/2013 | King-Smith et al. | |
| 8,502,651 B2 | 8/2013 | Birnbaum | |
| 8,723,820 B1 | 5/2014 | Han | |
| 8,773,405 B1 | 7/2014 | Ryshtun | |
| 8,878,823 B1 | 11/2014 | Kremin et al. | |
| 8,922,527 B2 | 12/2014 | Ryshtun et al. | |
| 8,956,230 B2 | 2/2015 | Adhikari | |
| 8,988,445 B2 | 3/2015 | Kuchenbecker | |
| 2001/0006383 A1 | 7/2001 | Fleck | |
| 2002/0021291 A1 | 2/2002 | Cook | |
| 2005/0083314 A1 | 4/2005 | Shalit | |
| 2005/0116940 A1 | 6/2005 | Dawson et al. | |
| 2005/0248549 A1 | 11/2005 | Dietz et al. | |
| 2005/0253816 A1 | 11/2005 | Himberg et al. | |
| 2007/0139399 A1 | 6/2007 | Cook | |
| 2008/0030486 A1 | 2/2008 | Cook | |
| 2008/0186255 A1 | 8/2008 | Cohen | |
| 2009/0167702 A1 | 7/2009 | Nurmi et al. | |
| 2009/0251338 A1 | 10/2009 | Marggraff et al. | |

(Continued)

*Primary Examiner* — Joseph Haley
(74) *Attorney, Agent, or Firm* — Treyz Law Group, P.C.; G. Victor Treyz; Joseph F. Guihan (57) ABSTRACT

A stylus may have an elongated body with opposing first and second ends. Electronic equipment may have a touch sensor that receives electromagnetic signals from one or more electrodes at the first end. The stylus may have a six-axis inertial sensor at the second end. Force sensors may be located at the first and second ends. User input from the force sensors, the inertial sensor, and other input-output devices may be used to supply the stylus with mode change commands. In response to the mode change commands the stylus may transition between operating modes such as a touch sensor mode and one or more inertial sensor modes. Inertial sensor data may be used to allow the stylus to operate as a joystick, a rotational controller, an air mouse, or other input devices in addition to serving as a touch sensor input device.

17 Claims, 9 Drawing Sheets

(56) References Cited

U.S. PATENT DOCUMENTS

| | | |
|---|---|---|
| 2009/0264713 A1 | 10/2009 | Van Loenen |
| 2009/0303204 A1* | 12/2009 | Nasiri ............... A63F 13/06 345/184 |
| 2010/0006350 A1* | 1/2010 | Elias ................ G06F 3/044 178/18.06 |
| 2010/0170726 A1 | 7/2010 | Yeh et al. |
| 2010/0188400 A1 | 7/2010 | Chen et al. |
| 2011/0006982 A1* | 1/2011 | Rhee ................ G06F 3/038 345/157 |
| 2011/0115751 A1 | 5/2011 | Wernersson |
| 2011/0155044 A1 | 6/2011 | Burch et al. |
| 2012/0013530 A1 | 1/2012 | Tsuboi |
| 2012/0062521 A1 | 3/2012 | Ahn et al. |
| 2012/0068964 A1 | 3/2012 | Wright |
| 2012/0105361 A1 | 5/2012 | Kremin et al. |
| 2012/0113065 A1 | 5/2012 | Chin |
| 2012/0127110 A1 | 5/2012 | Amm et al. |
| 2012/0146958 A1 | 6/2012 | Oda et al. |
| 2012/0249461 A1 | 10/2012 | Flanagan et al. |
| 2012/0331546 A1 | 12/2012 | Falkenburg et al. |
| 2013/0002606 A1 | 1/2013 | Mann |
| 2013/0021288 A1 | 1/2013 | Karkkainen et al. |
| 2013/0100070 A1 | 4/2013 | Zheng et al. |
| 2013/0147748 A1 | 6/2013 | Westerinen |
| 2013/0181953 A1 | 7/2013 | Hinckley et al. |
| 2013/0201162 A1 | 8/2013 | Cavillia et al. |
| 2013/0207925 A1 | 8/2013 | Ryshtun et al. |
| 2013/0249823 A1 | 9/2013 | Ahn et al. |
| 2013/0257777 A1* | 10/2013 | Benko ............... G06F 3/03545 345/173 |
| 2013/0286033 A1 | 10/2013 | Mesaros et al. |
| 2013/0286174 A1 | 10/2013 | Urakabe |
| 2014/0002422 A1 | 1/2014 | Stern et al. |
| 2014/0028635 A1 | 1/2014 | Krah |
| 2014/0055424 A1 | 2/2014 | Mercea et al. |
| 2014/0062962 A1 | 3/2014 | Jang et al. |
| 2014/0092055 A1* | 4/2014 | Radivojevic ........... G06F 3/016 345/174 |
| 2014/0118127 A1 | 5/2014 | Levesque et al. |
| 2014/0146021 A1* | 5/2014 | Trethewey ........... G06F 3/0488 345/179 |
| 2014/0160087 A1 | 6/2014 | Mercea |
| 2014/0229858 A1 | 8/2014 | Bleker et al. |
| 2014/0253522 A1 | 9/2014 | Cueto |
| 2014/0267184 A1 | 9/2014 | Bathiche et al. |
| 2015/0002481 A1 | 1/2015 | Mercea |
| 2015/0138128 A1 | 5/2015 | Herrick et al. |
| 2015/0169056 A1 | 6/2015 | Weddle et al. |
| 2015/0212578 A1 | 7/2015 | Lor et al. |
| 2015/0212602 A1 | 7/2015 | Lor et al. |

* cited by examiner

STYLUS WITH INERTIAL SENSOR

BACKGROUND

This relates generally to styluses, and, more particularly, to styluses that provide input to external equipment such as equipment with touch sensors.

Touch sensors are often used in electronic devices. For example, a tablet computer may have a touch screen display with a capacitive touch sensor. In many situations, a user may provide touch input by pressing a finger against the surface of a touch sensor. By moving the finger across the sensor, the user may manipulate displayed objects and may provide other input.

Touch input may also be provided using computer styluses. The stylus may have an elongated shape with a pointed tip to facilitate drawing and other activities. An electronic device can use a touch sensor to monitor the position of the tip of the stylus. The device can then draw a line on a display or take other suitable action in response to movement of the stylus tip across the sensor.

It can be challenging for a user to interact with electronic equipment using a computer stylus. A user may want to use an alternative input device such as a computer mouse or joystick when performing certain types of tasks. If care is not taken, a user's system may become cluttered with a number of potentially conflicting input devices.

It would therefore be desirable to provide improved computer styluses for providing input to electronic equipment.

SUMMARY

A stylus may have an elongated body with opposing first and second ends. The stylus may be used to provide input for controlling external electronic equipment. The electronic equipment may have a touch sensor that receives electromagnetic signals from electrodes at the first end of the stylus. The touch sensor may be part of a touch screen display in the electronic equipment may be used in controlling a separate display in the electronic equipment. Wireless circuitry in the stylus may be used to wirelessly transmit sensor data from the stylus to the electronic equipment.

The stylus may have a six-axis inertial sensor at the second end of the body. One or more force sensors may be located in the body. For example, a force sensor at the first end may be used to detect when a user presses the tip of the stylus against the touch sensor.

User input from the force sensors, the inertial sensor, and other input-output devices may be used to supply the stylus with mode change commands. The stylus and electronic equipment may transition between operating modes such as a touch sensor mode and one or more inertial sensor modes in response to the mode change commands.

In the touch sensor mode, the signals provided by the electrodes may be used to supply the touch sensor with touch input from the stylus. The touch input may be used, for example, to draw lines on the display in a drawing application.

In the inertial sensor mode, inertial sensor data may be gathered by the inertial sensor and wirelessly transmitted to the electronic equipment. The inertial sensor allows the stylus to operate as a joystick, a rotational controller, or other input devices in addition to serving as a touch sensor input device. For example, on-screen content may be rotated, tilted, or otherwise manipulated using rotational controller and joystick input from the inertial sensor.

DETAILED DESCRIPTION

A stylus may be used to provide touch input to a touch sensor. The touch sensor may be, for example, a capacitive touch sensor having an array of capacitive touch sensor electrodes. The stylus may be a passive stylus having a tip whose position is detected by the touch sensor using the capacitive touch sensor electrodes or may be an active stylus having one or more electrodes that emit electromagnetic signals that are detected using the capacitive touch sensor electrodes. The stylus may have input-output devices such as buttons, may have force sensors to detect tip and eraser press events, may have an inertial sensor to detect motion of the stylus, and may have other input-output devices. These devices allow the stylus to gather input from a user in multiple operating modes. For example, touch input can be gathered when operating the stylus fit a touch sensor mode (sometimes referred to as a drawing mode). Inertial sensor input may be gathered when operating the stylus in one or more inertial sensor input modes such as an air mouse mode, a rotational controller mode, a joystick mode, and/or other inertial sensor input modes.

The stylus may be used in interacting with one or more different electronic devices. For example, the stylus may be used to provide input to a device with a touch sensor, a device with a display, a device with a touch sensor and a display, or other equipment.

Figure 1:
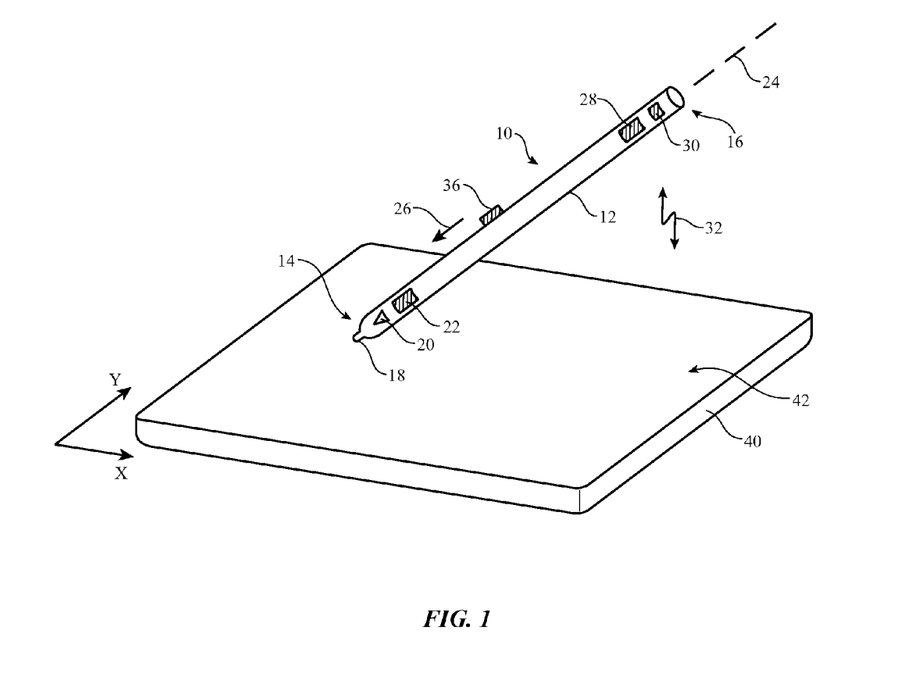
FIG. 1 is a perspective view of an illustrative stylus and electronic equipment with a touch sensor in accordance with an embodiment.

In the illustrative configuration of FIG. 1, stylus 10 is being used to provide input to device 40. Device 40 may have a front surface such as surface 42. Surface 42 may include a touch sensor (e.g., an array of capacitive touch screen electrodes or other touch sensor). If desired, surface 42 may also include a display. In some configurations, device 40 may not contain a display (i.e., device 40 may be a drawing tablet with a touch sensor but no visual output capabilities). In this type of configuration, device 40 may gather touch input, whereas corresponding visual output for the user may be provided using a separate display.

Stylus 10 may have an elongated shape. For example, stylus 10 may have a cylindrical body such as body 12 or other body that extends along longitudinal axis 24 between opposing ends 14 and 16. End 14 can be used for supplying touch input to device 40 for performing drawing tasks in a drawing application and other touch sensor input tasks and may sometime be referred to as the drawing end of stylus 10. End 16 of stylus 10 may be used for providing eraser input to a drawing application or other touch sensor tasks and may sometimes be referred to as the eraser end of stylus 10.

The body at end 14 of stylus 10 may form stylus tip 18. Stylus tip 18 may be used to provide touch sensor input to the touch sensor on surface 42. For example, stylus tip 18 may be an active tip that provides electromagnetic signals to the touch sensor of device 40 using electrodes 20. If desired, electrodes such as electrodes 20 may be located at both ends of stylus 10 (e.g., a writing electrode or other electrode may be provided at end 14 and an erasing electrode or other electrode may be provided at end 16). The electromagnetic signals supplied by electrodes 20 may be modulated using an amplitude modulation scheme or other suitable modulation scheme. The touch sensor of device 40 may receive the modulated electromagnetic signal using an array of capacitive electrodes and may process the received signals to identify the position of tip 18 on surface 42 in lateral dimensions X and Y. End 16 of stylus 10 may also have an active touch sensor electrode or may have a passive component such as a conductive element that is used in providing eraser touch input when end 16 is adjacent to the touch sensor on surface 42.

Stylus 10 may have force sensors such as force sensors 22 and 30. Sensors 22 and 30 may be used to detect stylus press events. To provide this type of force-based input, a user may press end 14 or end 16 of stylus 10 against surface 42. For example, when tip 18 of stylus 10 is resting against surface 42, the user may move stylus 10 in direction 26 along longitudinal axis 24. This presses tip 18 against surface 42 and creates a detectable force input to force sensor 22. Sensor 30 may be activated in the same way by pressing end 16 against surface 42.

Force sensor input may be provided in the form of single press events (e.g., single clicks), may be provided in the form of multiple presses (e.g., double clicks, triple clicks, quadruple clicks, etc.), may be used to provide continuous analog input (e.g., a force signal that varies continuously as a function of applied user force to control audio volume, line width in a drawing application, of other adjustable parameters for device 40), or may be combined with other user input to generate commands or other input for stylus 10.

Stylus 10 may include buttons such as button 36. A user may press button 36 to supply stylus 10 with button press input. If desired, buttons such as button 36 may be omitted from stylus 10 to avoid cluttering the exterior surface of stylus 10. The use of button 36 in the configuration for stylus 10 that is shown in FIG. 1 is merely illustrative.

Stylus 10 may have one or more motion sensors such as inertial sensor 28. Motion sensors may be located at end 14, at end 16, or elsewhere in the body of stylus 10. In the example of FIG. 1, inertial sensor 28 is located at end 16 of stylus 10.

Inertial sensor 28 may include an accelerometer such as a triaxial (three-axis) accelerometer. A triaxial accelerometer may use a microelectromechanical systems (MEMs) device or other sensor to detect acceleration for stylus 10 in three orthogonal directions (i.e., the three orthogonal Cartesian coordinates X, Y, and Z). Inertial sensor 28 may also include triaxial gyroscope. A triaxial gyroscope may use a MEMs device or other sensor to measure rotation around three orthogonal axis (i.e., rotation angles $\Theta_X$, $\Theta_Y$, and $\Theta_Z$, about the X axis, Y axis, and Z axis, respectively). In configurations in which inertial sensor 28 has the capability to measure motion in six axes (e.g., by measuring linear motion with respect to three axes using a triaxial accelerometer and by measuring rotational motion with respect to three axes using a triaxial gyroscope), inertial sensor 28 may be referred to as a six-axis inertial sensor or six axis inertial measurement unit. If desired, sensor 28 may include light-based motion sensing components, magnetic compass structures, and/or other components to gather information on motion with respect to some or all of the six axes. Configurations for sensor 28 in which sensor 28 incorporates a three-axis accelerometer for measuring motion in X, Y, and Z, a three-axis gyroscope for measuring rotational motion (angles $\Theta_X$, $\Theta_Y$, and $\Theta_Z$), and a three-axis magnetometer for measuring the orientation of stylus 10 in space) may also be used. In these configurations, sensor 28 may sometimes be referred to as a nine-axis inertial sensor or nine-axis inertial measurement unit.

In addition to providing near-field electromagnetic signals from electrodes 20, stylus 10 may be used to provide external equipment such as equipment. 40 with wireless signals 32. Wireless signals 32 may include Bluetooth® signals, wireless local area, signals such as IEEE 802.11 signals, or other radio-frequency wireless signals. Wireless signals 32 may be used to convey information from sensors and other input-output devices in stylus 10 to external equipment such as equipment 40. Wireless signals 32 may include signals with motion information from inertial sensor 28, force information from source sensors 22 and 30, button press information from buttons such as buttons 36, and other input-output device data. This data may be processed internally by control circuitry in stylus 10 and may be used in adjusting the operation of stylus 10 in addition to controlling external equipment 40.

Figure 2:
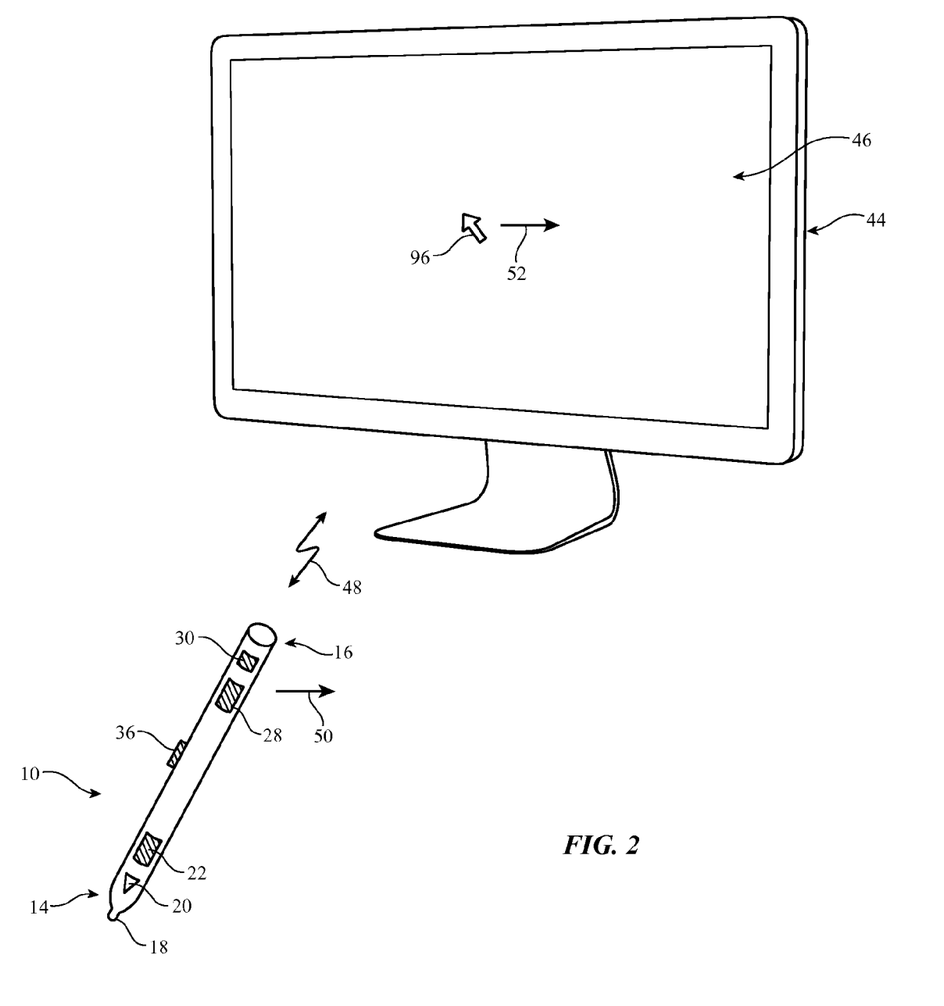
FIG. 2 is a perspective view of an illustrative stylus being used to provide inertial sensor input to a device with a display in accordance with an embodiment.

As show in the example of FIG. 2, stylus 10 may be used to provide input to external electronic equipment 44 that is not being touched by tip 18 at drawing end 14 of stylus 10. Stylus 10 may communicate with equipment 44 using wireless link 48 (e.g., a Bluetooth® link, a wireless local area network link such as an IEEE 802.11 link, etc.). Wireless signals that may be transmitted and received using link 48 include inertial sensor signals, force sensor signals, and other information gathered within stylus 10.

A user may control the position of stylus 10 while holding stylus 10 in free space and/or while pressing tip 18 against a touch sensor, table top, or other surface, inertial sensor 28 may gather information on the movement of stylus 10 in real time. This information may be used to control the movement of objects on display 46 or to take other actions in equipment 44. For example, a user may move end 16 of stylus 10 in direction 50. Wireless signals may be transmitted from stylus 10 to equipment 44 over link 48 that inform equipment 44 of the movement of stylus 10. In response to receiving information on the movement of stylus 10 in direction 50, equipment 44 may move an on-screen object, such as pointer 96 in corresponding direction 52 (i.e., stylus 10 may be used as an air mouse). If desired, equipment 44 may take other actions in response to receiving the movement signals or other input from stylus 10. For example, equipment 44 may make changes to visual output on display 46, may make menu selections, may change audio output settings, may use a camera, sensor, or other device in equipment 44 to gather data, or may take other suitable actions.

The type of response that is made by equipment 44 to motion sensor data and other information from stylus 10 that is received wirelessly over link 48 may depend on context. If, for example, equipment 44 is running a game application, stylus 10 may be used as a sword, a wand, or a hammer (as examples). In situations in which equipment 44 is running a music application, the motion data that is received from stylus 10 may allow stylus 10 to be used as a drum stick, a xylophone mallet, a gong beater, a conductor's baton, or other musical instruments. In situations in which equipment 44 is running a painting application, stylus 10 may serve as a virtual paint brush or spray paint source. When running business presentation software, stylus 10 may be used as an air mouse to move cursors such as pointer 96 or motion gestures gathered with stylus 10 may be used to flick forwards and backwards through pages in a presentation document. Stylus 10 may also be used as a free-standing six-axis motion-based input device for other types of applications and for operating system functions, if desired.

Figure 3:
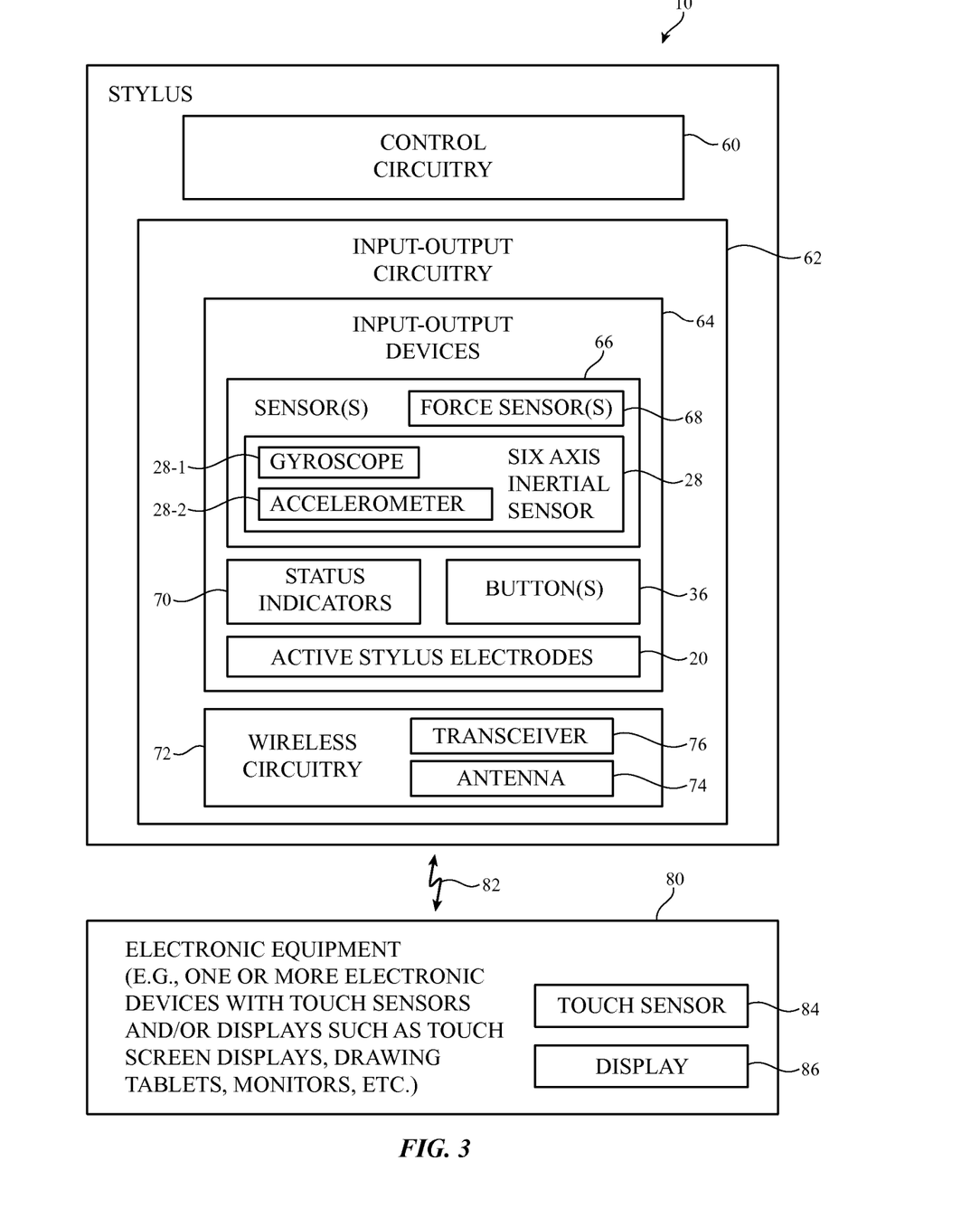
FIG. 3 is a schematic diagram of an illustrative stylus and external equipment in accordance with an embodiment.

A schematic diagram of an illustrative stylus with an inertial sensor is shown in FIG. 3. As shown in FIG. 3, stylus 10 may have control circuitry 60. Control circuitry 60 may include storage and processing circuitry for supporting the operation of stylus 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 60 may be used to control the operation of stylus 10. The processing circuitry may be based on one or more microprocessors, microcontrollers, digital signal processors, baseband processors, power management units, audio chips, application specific integrated circuits, etc.

Input-output circuitry 62 in stylus 10 may include input-output devices 64 and wireless circuitry 72.

Input-output devices 64 may be used to allow data to be supplied to stylus 10 and to allow data to be provided from stylus 10 to external devices. Input-output devices 64 may include buttons such as buttons 36. Buttons 36 may include mechanical buttons and non-mechanical buttons and may be used in gathering button press information from a user. Input-output devices 64 may also include status indicators 70 such as light-emitting diodes and other devices that provide status output to a user. Active stylus electrodes 20 may be located at end 14 and/or end 16 and may be used to provide near-field electromagnetic signals to a capacitive touch sensor in external equipment.

Input-output devices 64 may include sensors 66. Sensors 66 may include force sensors 68. Force sensors 68 may include a force sensor at end 14 of stylus 10 such as force sensor 22 and/or a force sensor at end 16 of stylus 10 such as force sensor 30. Sensors 66 may also include inertial sensor 28. Inertial sensor 28 may include triaxial accelerometer 28-2 and triaxial gyroscope 28-1 (e.g., sensor 28 may be a six-axis inertial sensor) and/or other components for measuring motion of stylus 10 (e.g., a tri-axial magnetometer may be included in sensor 28 in a nine-axis inertial sensor configuration). Sensors 66 may also include additional sensors such as a temperature sensor, an ambient light sensor, a light-based proximity sensor, a touch sensor, a magnetic sensor, pressure sensor, and/or other sensors. Input-output devices 64 may, if desired, include microphones, speakers, tone generators, vibrators, cameras, data ports, and other equipment. A user can control the operation of stylus 10 and the external equipment with which stylus 10 interacts by supplying commands through input-output devices 64 and may receive status information and other output from stylus 10 using the output resources of input-output devices 64.

Control circuitry 60 may be used to run software on stylus 10 that controls the operation of stylus 10. During operation of stylus 10, the software running on control circuitry 60 may process sensor input, button input, and input from other devices 64 to monitor the movement of stylus 10 and other user input. The software running on control circuitry 60 may detect user commands and may communicate with external equipment.

To support wireless communications with external equipment 80 over wireless links such as link 82, stylus 10 may include active stylus electrodes 20 and wireless circuitry 72. Wireless circuitry 72 may include a radio-frequency transceiver such as transceiver 76. Wireless circuitry 72 may also include one or more antennas such as antenna 74. Transceiver 76 may transmit and/or receive wireless signals using antenna 74. The wireless signals may be Bluetooth® signals, IEEE 802.11 wireless local area network signals, long range signals such as cellular telephone signals, near-field communications signals, or other wireless signals.

External equipment 80 may include one or more electronic devices having components such as touch sensor 84 and display 86. Touch sensor 84 may be a capacitive touch sensor, a resistive touch sensor, an acoustic touch sensor, a force-based touch sensor, an optical touch sensor, a touch sensor that uses other touch technologies, or a touch sensor that uses two or more of these types of touch sensor structures. Display 86 may be a liquid crystal display, an organic light-emitting diode display, an electrophoretic display, an electrowetting display, or any other suitable type of display. Display 86 may be a touch screen display (e.g., a display that incorporates touch sensor 84) or may be insensitive to touch.

In some configurations, touch sensor 84 and display 86 may be implemented in separate devices. For example, touch sensor 84 may form part of a drawing tablet without a display and display 86 may form part of a computer monitor or other equipment without a touch sensor. Configurations in which equipment 80 includes other combinations of touch sensors and displays may also be used. For example, stylus 10 may be used to provide input to a tablet computer, cellular telephone, or computer through a touch screen display while also providing wireless input to control a computer or other device with a display with an optional touch sensor or while providing input to the tablet computer, cellular telephone, or computer with the touch screen display.

To avoid the need for a user to switch excessively between different input devices, stylus 10 may be provided with sufficient capabilities to gather multiple different types of input. For example, stylus 10 may be used as both a touch sensor input device in which a user draws lines with tip 18 on the surface of a touch sensor and as a six-axis or nine-axis inertial controller. A user of a drawing program may use stylus 10 to draw lines that form on-screen objects. When it is desired to rotate or tilt the object, the user can use inertial sensor 28 in stylus 10 to perform appropriate on-screen object rotation and/or tilt operations. As an example, a user may select an on-screen object by double tapping on the object with tip 18, by touching the on-screen object and pressing button 36, by encircling the object with a line drawn with tip 18, etc. After selecting the object, the user may manipulate the object (rotate, tilt, etc.) using inertial sensor input gathered by moving stylus 10. The object that is being manipulated in this way may or may not be shown on surface 42. For example, the selected object may be manipulated on-screen or may be manipulated off-screen by moving stylus 10 while gathering inertial sensor input from inertial sensor 28. In this way, stylus 10 may serve as a virtual representation of the object being manipulated.

As another example, consider a user who is interacting with a business presentation program. During touch sensor operations, tip 18 of stylus 10 may be used to annotate a page of a presentation. During inertial sensor operations with the same stylus, the user may move an on-screen pointer to point to particular portions of the presentation or may use stylus 10 to gather air mouse gestures (e.g., to flick between pages). As these examples demonstrate, the ability of stylus 10 to serve both as a touch sensor input device and as an inertial sensor input device allows the user to perform a variety of input operations without switching between different types of input device.

Figure 4:
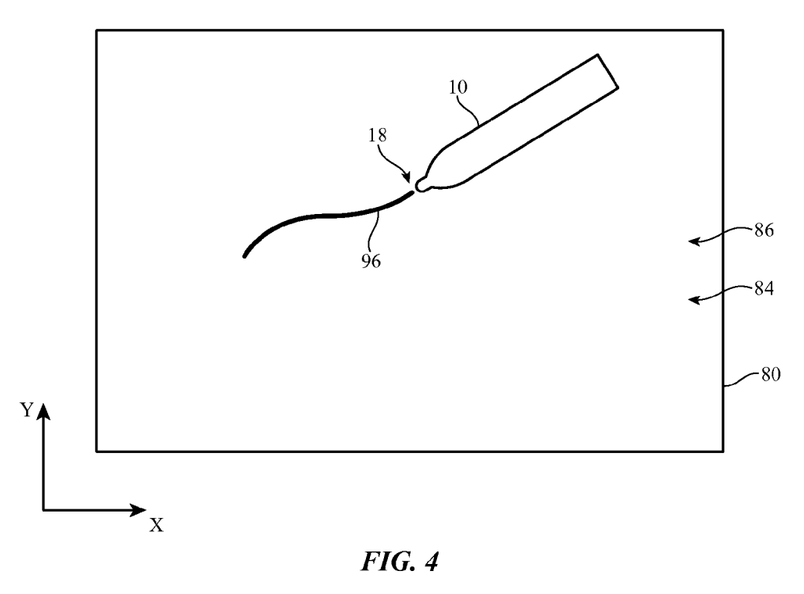
FIG. 4 is a diagram of an illustrative stylus that is being used to draw a line on a display in accordance with an embodiment.

FIG. 4 shows how stylus 10 may be used to draw lines and other supply other touch sensor input. As shown in FIG. 4, equipment 80 may include a display such as display 86. Touch sensor 84 may overlap display 86 (i.e., display 86 may be a touch screen display). During touch input operations, a user may move tip 18 of stylus 10 across the surface of equipment 80 in lateral dimensions X and Y. A user may, for example, draw lines such as line 96 of FIG. 4 by moving tip 18 of stylus 10 in dimensions X and Y on the surface of equipment 80. In addition to drawing lines such as line 96, stylus 10 may be used to input handwritten text, to draw and move objects, to select from available on-screen options (e.g., by placing tip 18 within a clickable on-screen box), may be used to manipulate drop-down menus, may be used to control navigation sliders and other on-screen objects, or may otherwise be used in providing touch sensor input for equipment 80. In response to the touch input provided to touch sensor 84, equipment 80 may update visual content on display 86 and/or may update visual content on another external display. Equipment 80 may also take other actions in response to touch input from stylus 10 (e.g., audio adjustments may be made in equipment 80, settings may be changed, images may be captured with a camera, sensor data may be gathered, and other activities may be performed).

Figure 5:
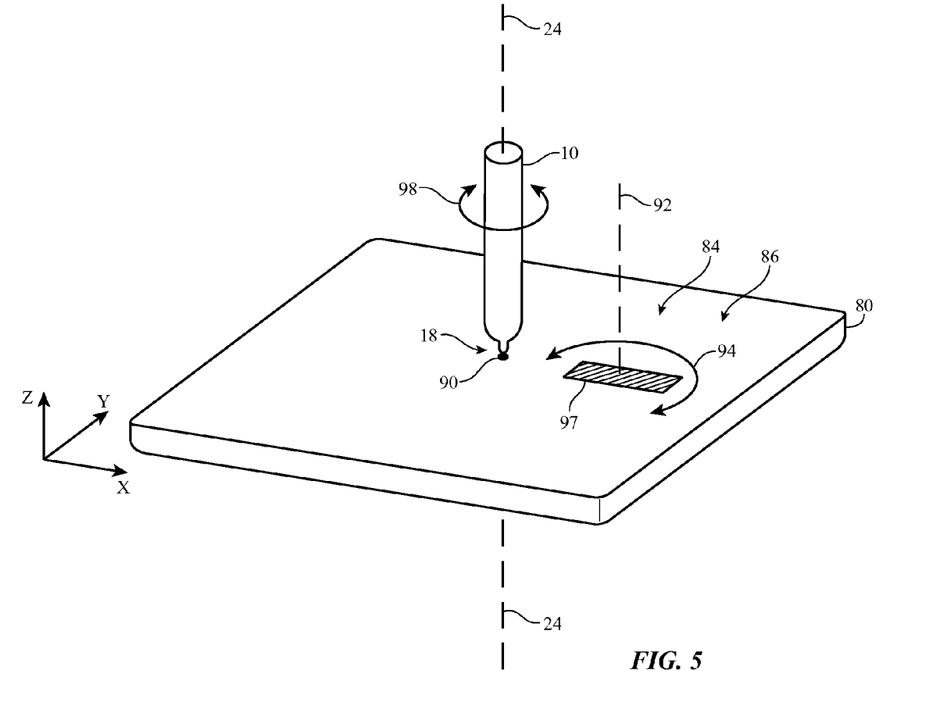
FIG. 5 is a perspective view of an illustrative stylus that is being rotated to rotate an on-screen object on a touch screen display in accordance with an embodiment.

As shown in FIG. 5, stylus 10 may be rotated to control equipment 80. Rotational motion of stylus 10 may be monitored using inertial sensor 28. Stylus 10 may be rotated when stylus 10 is being held in free space by a user or may be rotated while tip 18 of stylus 10 is being pressed against a surface such as the surface of equipment 80 of FIG. 5. Equipment 80 of FIG. 5 may be a touch screen display that includes touch sensor 84 and display 86 (i.e., touch sensor 84 may overlap display 86).

Equipment 80 may display content on display 86 such as object 97. When tip 18 is pressed against the surface of equipment 80 at location 90, location 90 (and tip 18) may form a point of rotation for stylus 10 and may help stabilize stylus 10 so that stylus 10 may be rotated smoothly and accurately. When operated in a rotational controller mode in this way, stylus 10 may be rotated in directions 98 about axis 24 while tip 18 remains in contact with point 90. Rotational motion of stylus 10 about axis 24 may be detected by inertial sensor 28 and transmitted wirelessly to equipment 80 using wireless circuitry 72. Equipment 80 may receive the wirelessly transmitted signals and may take appropriate action based on the rotational input gathered using stylus 30. For example, in a drawing application that is displaying an on-screen object such as object 97 the input from inertial sensor 28 may be used to rotate object 97 about rotational axis 92 or other suitable rotational axis for object 97. Rotational axis 92 may be aligned with axis 24, so that tilting of stylus 10 relative to the X-Y plane (and Z-axis) of FIG. 5 results in corresponding changes to the orientation, of axis 92 or rotational axis 92 may be in a fixed location relative to object 97 (e.g., axis 92 may lie in the X-Y plane of FIG. 5, which is the plane of display 86, may be perpendicular to the X-Y plane of FIG. 5, etc.).

Figure 6:
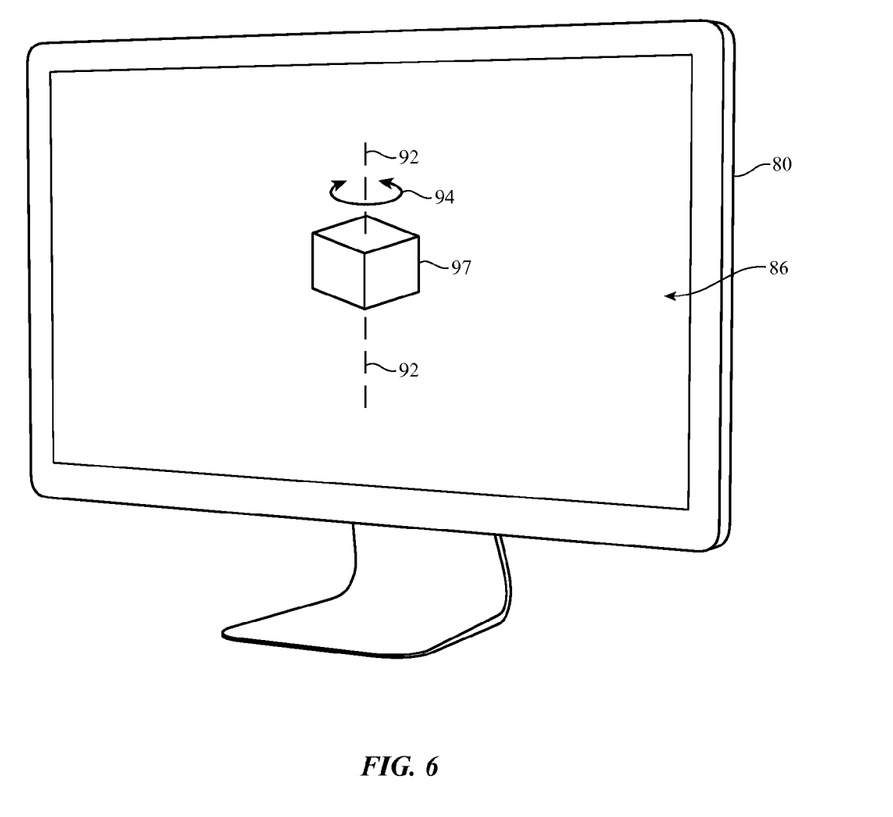
FIG. 6 is a perspective view of an illustrative display on which an object is being rotated using rotational input from a stylus in accordance with an embodiment.

If desired, object 97 may be manipulated while being displayed on other external equipment such as equipment 80 of FIG. 6. In this example, equipment 80 is separate from the equipment that has the touch sensor to gather stylus touch input (i.e., equipment 80 of FIG. 6 includes display 86 but need not contain a touch sensor such as optional touch sensor 84). A user may rest tip 18 of stylus 10 against touch sensor 84 or other surface while inertial sensor 28 gathers rotational input information related to how much stylus 10 is being rotated about axis 24 in directions 98. Rotational input may be supplied to equipment 80 of FIG. 6 wirelessly. Equipment 80 may then perform object rotation operations or other tasks in response to the rotational input. Equipment 80 may, for example, rotate an on-screen object such as object 97 of FIG. 6 about axis 92 in directions 94 by an amount that is proportional to the amount by which the user rotated stylus 10 about axis 24 in directions 98. Axis 92 may line within the plane of display 86 or may have other orientations. In configurations in which tilting of stylus 10 relative to touch sensor 84 is being monitored, the amount of tilting of stylus 10 can be used to tilt axis 92 by a corresponding amount.

Figure 7:
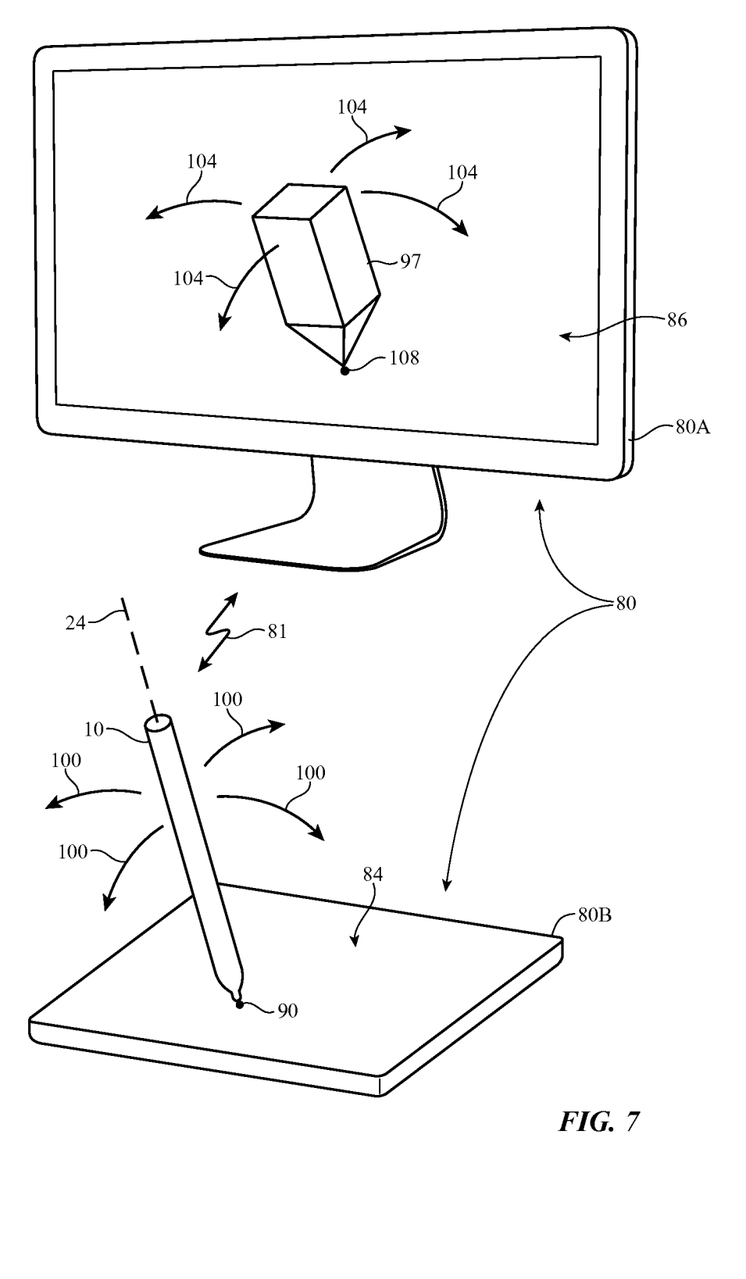
FIG. 7 is a perspective view of a stylus that is being used to provide joystick input to manipulate an on-screen object in accordance with an embodiment.

If desired, stylus 10 may be operated in a joystick mode. As shown in FIG. 7, equipment 80 may include equipment 80A and 80B. Equipment 80A (e.g., a tablet computer, writing pad, cellular telephone with a touch screen, etc.) may have a touch sensor such as touch sensor 84 for gathering touch input from stylus 10. Equipment 80A may have display 86 for displaying content for a user such as object 97 or other image data. Stylus 10 may be operated in joystick mode when tip 18 of stylus 10 is being pressed against touch sensor 84, the surface of a table, or other flat surface (as an example).

In the illustrative configuration of FIG. 7, stylus 10 is being operated in joystick mode while tip 18 is pressed against touch sensor 84 at point 90. Point 90 may serve as a pivot point (and, if desired, rotational point) for stylus 10. Stylus tip 18 may be formed form an elastomeric material or other material that prevents tip 18 from slipping across the surface of equipment 80B and that helps stylus 10 serve as a joystick.

During joystick mode, inertial sensor 28 gathers information on movement of stylus 10. For example, sensor 28 may gather Information on the tilting of stylus 28 relative to the surface of equipment 80B in directions such as directions 100. Rotational motion can also be monitored.

Wireless signals 81 may be used to convey movement data from stylus 10 to equipment 80A and/or equipment 80B. For example, wireless signals may be conveyed from stylus 10 to equipment 80A and/or 80B that inform equipment 80A and/or 80B how much stylus 10 has been tilted in directions 100 and/or rotated about axis 24.

A user may manipulate the position of end 16 of stylus 10 while treating stylus 10 as a joystick. Equipment such as equipment 80A and/or 80B may display on-screen content and take other actions based on joystick motion data received from stylus 10. As shown in FIG. 7, for example, equipment 80A (or equipment 80B) may display an on-screen object such as object 97. As the user tilts stylus 10 about pivot point 90 in directions 100, equipment 80A (or 80B) may tilt object 97 in directions 104 about pivot point 108 by an amount that corresponds to the amount by which stylus 10 is tilted in directions 100 about pivot point 90. Object 97 may also be rotated in response to rotation of stylus 10 about rotational axis 24, as described in connection with FIG. 6 (i.e., stylus 10 may simultaneously act in a joystick mode and rotational controller mode).

The manipulation of on-screen content such as tilting and rotation of object 97 is an example of an action that may be taken by equipment 80 in response to joystick mode input and rotational controller input from stylus 10. Other suitable actions may be taken by equipment 80 if desired (e.g., rotation of an on-screen dial or other user interface icon, adjustment of a volume level, brightness setting, or other parameter in game, drawing application, or other program, navigation between on-screen objects, etc.).

It may be desirable to use stylus 10 to provide different types of input at different times. For example, it may be desirable to use stylus 10 in a touch sensor mode when drawing lines such as line 96 of FIG. 4 or performing other drawing functions. When it is desired to rotate an object or provide other rotational controller input, it may be desirable to momentarily inactivate the touch sensor capabilities of stylus 10 (and, if desired, equipment 80) in favor of the rotational controller capabilities of stylus 10 and equipment 80 described in connection with FIGS. 5 and 6. Joystick mode inputs may be gathered from stylus 10 in situations in which rotation is not needed or when tilting inputs are needed (e.g., to control an airplane in a flight simulator). Some of these modes of operation may not be mutually exclusive. For example, it may be desirable to both be able to tilt an on-screen object and to rotate the on-screen object when a user is working in a computer-aided design application. Nevertheless, in many situations the ability to switch between different operating modes for stylus 10 will help a user from providing inappropriate input with stylus 10. For example, if a user is using stylus 10 as a joystick, it may be desirable to inhibit touch sensor input capabilities (for stylus 10 and/or equipment 80) so that slippage in the position of tip 18 does not inadvertently result in a line being drawn on the display.

In general, any suitable criteria may be used to determine when it is appropriate to switch between different operating modes for stylus 10. A user may, for example, provide user input by pressing a button, by pressing tip 18 (or eraser end 16) of stylus 10 against a surface to actuate force sensor 22 (or 30), or by shaking stylus 10 (to provide input to inertial sensor 28). Mode switching may also be performed when environmental criteria are satisfied (e.g., when a predetermined time and date are reached, when ambient light levels, temperature levels, pressure levels, or other environmental parameters fall within predetermined limits, or when other mode switching criteria are satisfied). Combinations of user input and environmental factors may also be used.

Figure 8:
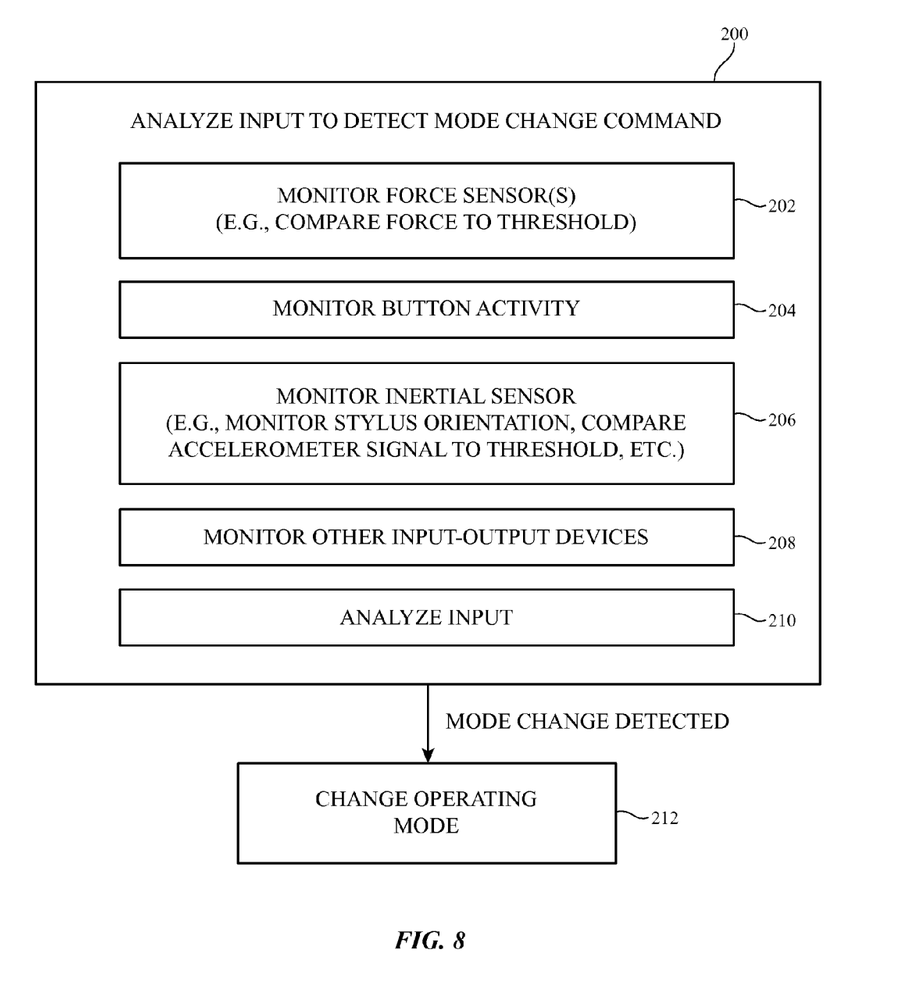
FIG. 8 is a flow chart of illustrative steps involved in gathering input to determine when to make changes in the operating mode of a stylus in accordance with an embodiment.

Illustrative steps involved in gathering user input and in analyzing the gathered input to determine whether or not to switch operating modes for stylus 10 are shown in FIG. 8. At step 200, control circuitry 60 of stylus 10 is used to gather input to stylus 10 and to analyze the gathered input to determine whether or not to change the operating mode of stylus 10.

During the operations of step 202, stylus 10 may monitor force sensors such as sensors 22 and 30. In some situations, a user will be holding stylus 10 between the user's fingers. In this type of situation, it may be convenient for the user to press tip 18 or end 16 of stylus 10 against equipment 80 or other object. When pressed in this way, the force sensor signal may exceed a predetermined amount, indicating that a mode change is desired. A single press on tip 18 (or end 16) may be used to invoke a mode change or other patterns of tip presses may be used (e.g. one pattern of presses may be used to invoke a first mode of operation and another pattern of presses may be used to invoke a distinct second mode of operation).

At step 204, stylus 10 may monitor button activity. For example stylus 10 may use control circuitry 60 to determine whether button 36 of FIG. 1 has been pressed and/or has been pressed in a particular pattern.

At step 206, stylus 10 may monitor sensor 28 to determine whether stylus 10 has been moved by more than a particular amount or in a particular pattern. As an example, stylus 10 may use sensor 28 to determine whether a user has shaken stylus 10 by more than a predetermined amount and/or may use sensor 28 to monitor for a predetermined pattern of shakes (e.g., three rapid shakes in succession, a circular motion, a flick of end 16 in the air, or other movement pattern that is indicative of a mode change command).

At step 208, stylus 10 may use circuitry 60 to monitor for other input from input-output devices 64 (e.g., sensor input based on user input and/or environmental factors).

At step 210, information gathered from input-output devices 64 may be analyzed to determine whether the user of stylus 10 is directing stylus 10 to change its operating mode. Control circuitry 60 may be configured to recognize patterns in the inputs gathered during steps such as steps 202, 204, 206, and 208. For example, a pattern of force sensor signals arising from a particular pattern of presses against stylus tip 18 (or end 16) may be associated with a predetermined operating mode, a pattern of movements of end 16 (e.g. by waving stylus 10 in the air in with a particular motion) may be associated with a predetermined operating mode, button presses of particular patterns and information from other input-output devices or patterns of two or more of these inputs may be associated with a command to enter a particular operating mode.

At step 212, control circuitry 60 may change the operating mode of stylus 10 as appropriate based on the inputs analyzed during the operations of step 210. The mode of operation of equipment 80 may also be changed, if desired. Mode change commands may be mode specific. For example, a user may enter joystick mode by pressing down on tip 18 once, may enter rotational controller mode by pressing down on tip 18 twice, may enter an air mouse mode by pressing down on tip 18 three times, and may enter touch sensor mode by pressing down on tip 18 four times. Mode change commands may also be generic. For example, whenever a double press on tip 18 is detected, stylus 10 may switch to another operating mode.

Figure 9:
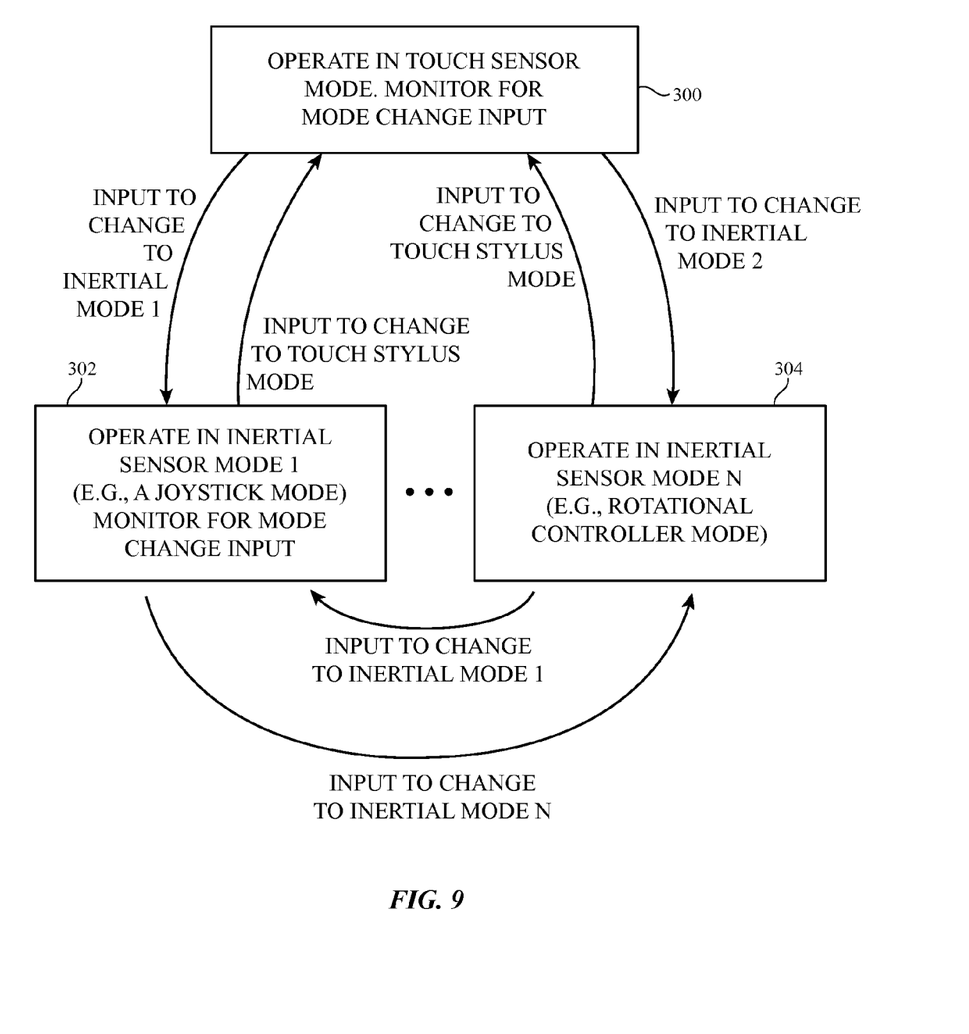
FIG. 9 is a diagram illustrating operations involved in gathering and using different types of input from a stylus in accordance with an embodiment.

FIG. 9 is a flow chart of illustrative steps involved in operating stylus 10 and equipment 80.

At step 300, stylus 10 may be operated in touch sensor mode. During touch sensor mode, control circuitry 60 may use active stylus electrodes 20 to provide a near-field electromagnetic signal to touch sensor 84 in equipment 80. Equipment 80 may use touch sensor 84 to gather drawing input and other touch sensor input from tip 18 at drawing end 14 of stylus 10 and/or from end 16 of stylus 10. Tip 18 may foe used to draw lines and other items, whereas end 14 may be used to erase items and/or other actions may be taken in response to detection of touch input from stylus 10 (e.g., menu selections, manipulation of on-screen content adjustment of operating parameters in equipment 80, etc.).

During the touch sensor mode operations of step 300, stylus 10 may use control circuitry 60 and input-output circuitry 62 to monitor for a mode change command or satisfaction of other criteria indicative of the desire to change operating modes in stylus 10 and equipment 80. For example, circuitry 60 may perform input monitoring and analysis operations of the type shown in FIG. 8.

In response to a mode change command or satisfaction of other suitable mode change criteria, control circuitry 60 may change the operation mode of stylus 10. For example, if input is received that indicates that stylus 10 should be changed to a first inertial mode (e.g., a joystick mode or other mode using input from inertial sensor 28), stylus 10 may enter the first inertial operating mode (step 302). During the operations of step 302, stylus 10 may gather user input using sensor 28 (e.g., to provide equipment 80 with joystick input while tip 18 is pressed against sensor 84 or other surface in equipment 80 and while a user tilts stylus 10 with respect to equipment 80). The operations of step 302 also involve monitoring input-output circuitry 62 for additional mode change input.

In response to detection of a mode change command or satisfaction of other suitable mode change criteria, control circuitry 60 may change the operating mode of stylus 10. For example, if input is received that indicates that stylus 10 should be changed to an Nth inertial mode (e.g., a rotational controller mode using rotational input from inertial sensor 28, an air mouse mode, etc.), stylus 10 may enter the Nth inertial operating mode (step 304). During the operations of step 304, stylus 10 may gather user input using sensor 28 (e.g., to provide equipment 80 with rotational controller input while tip 18 is pressed against sensor 84 or other surface in equipment 80). Sensor 28 may be used to gather input while a user rotates stylus 10 about rotational (longitudinal) axis 24 with respect to equipment 80. The operations of step 304 also involve monitoring input-output circuitry 62 for additional mode change input. There may be any suitable number of inertial sensor modes of operation for stylus 10 (e.g., 1 . . . N). Inertial sensor modes may involve use of inertial sensor data for operations such as tilting, spinning, rolling, zooming (e.g., controlling a zoom setting by rotation of stylus 10), joystick operations, air mouse operations, etc.

The mode changes of FIG. 9 may take place whenever monitoring operations indicate that a user has input a mode change command. For example, if a command is received to transition to touch sensor mode, stylus 30 may transition from mode 304, mode 302, or other inertial sensing mode to touch sensor mode 300. In general, there may be any suitable number of touch sensor modes, any suitable number of inertial sensor modes, and/or any suitable number of other operating modes for stylus 10. The configuration of FIG. 9 is merely illustrative.

If desired, multiple styluses may be used to control electronic equipment 80 simultaneously. For example, one stylus 10 may be used to gather first inertial sensor data while another stylus 10 may be used to gather second inertial sensor data. Both the first and second inertial sensor data may be provided to equipment 80 as input (e.g., to manipulate on-screen content, to control a game, etc.).

The foregoing is merely illustrative and various modifications can be made by those skilled in the art without departing from the scope and spirit of the described embodiments. The foregoing embodiments may be implemented individually or in any combination.

What is claimed is:

1. A stylus that provides input to external equipment, comprising: an elongated body with first and second opposing ends; a tip at the first end; an inertial sensor in the elongated body that gathers inertial sensor data; an electrode at the first end; wireless circuitry including a radio-frequency transceiver and an antenna; and control circuitry that provides touch input to a touch sensor in the external equipment by transmitting near-field electromagnetic signals to the touch sensor with the electrode at the first end when operating in a touch sensor mode and that provides inertial sensor input to the external equipment by transmitting the inertial sensor data to the external equipment using the radio-frequency transceiver and the antenna when operating in an inertial sensor mode, wherein the control circuitry operates in the touch sensor mode when the tip of the stylus is moved across a surface of the external equipment, and wherein the control circuitry operates in the inertial sensor mode when the tip of the stylus is pressed against the surface of the external equipment in a stationary location.

2. The stylus defined in claim 1 wherein the inertial sensor comprises an inertial sensor selected from the group consisting of: a six-axis inertial sensor and a nine-axis inertial sensor.

3. The stylus defined in claim 2 wherein the control circuitry switches between the touch sensor mode and the inertial sensor mode in response to a mode change command.

4. The stylus defined in claim 2 further comprising:
an input-output device with which the control circuitry receives the mode change command.

5. The stylus defined in claim 4 wherein the input-output device comprises a force sensor at the first end.

6. The stylus defined in claim 5 wherein the inertial sensor mode comprises a joystick mode in which tilt data is gathered by the control circuitry using the inertial sensor.

7. The stylus defined in claim 5 wherein the inertial sensor mode comprise a rotational controller mode in which rotational input is gathered by the control circuitry using the inertial sensor.

8. The stylus defined in claim 2 wherein the control circuitry receives the mode change command using the inertial sensor.

9. The stylus defined in claim 2 wherein the inertial sensor mode comprises a joystick mode in which tilt data is gathered by the control circuitry using the inertial sensor.

10. The stylus defined in claim 9 wherein the inertial sensor is located at the second end.

11. The stylus defined in claim 10 further comprising a force sensor at the second end.

12. A stylus, comprising: a body having opposing first and second ends; a tip at the first end; an electrode at the first end that emits near-field electromagnetic signals for a touch sensor of external equipment; an inertial sensor at the second end; wireless circuitry; and control circuitry that operates in a first mode in which the near-field electromagnetic signals are emitted and a second mode in which inertial sensor data from the inertial sensor is wirelessly transmitted using the wireless circuitry, wherein the control circuitry operates in the first mode when the tip of the stylus is moved across a surface of the external equipment, and wherein the control circuitry operates in the second mode when the tip of the stylus is pressed against the surface of the external equipment in a stationary location.

13. The stylus defined in claim 12 wherein the inertial sensor comprises a sensor selected from the group consisting of: a six-axis inertial sensor and a nine-axis inertial sensor, the stylus further comprising a force sensor at the first end, wherein the control circuitry gathers signals from the force sensor.

14. The stylus defined in claim 13 wherein the control circuitry switches between operation in the first mode and operation in the second mode in response to the signals gathered from the force sensor.

15. The stylus defined in claim 14 wherein the tip comprises an elastomeric tip and wherein the inertial sensor data comprises tilt data corresponding to how much the body is tilted with respect to the touch sensor while the tip is in contact with the surface of the external equipment.

16. The stylus defined in claim 15 wherein the control circuitry gathers rotation data from the inertial sensor while the tip contacts the surface of the external equipment and wirelessly transmits the rotation data using the wireless circuitry.

17. The stylus defined in claim 12 further comprising an additional electrode located at the second end that emits near-field electromagnetic signals for the touch sensor.

\* \* \* \* \*